Patented Nov. 14, 1950

2,529,590

UNITED STATES PATENT OFFICE 2,529,590

PREPARATION OF A HYDROCARBON DRYING OIL

Herman S. Bloch, Chicago, Ill., assignor to Universal Oil Products Company, Chicago, Ill., a corporation of Delaware No Drawing. Application November 29, 1946, Serial No. 713,076

5 Claims. (Cl. 196—78)

This is a continuation-in-part of my co-pending application Serial No. 514,968 filed December 20, 1943, now abandoned.

This invention relates to a new composition of matter and more particularly to a complex having the approximate composition

$$AlX_3 \cdot HX \cdot C_nH_{2n-m}$$

where $n$ is greater than about 10 (usually between about 15 and about 25) and $m$ is a number varying between about 4 and about 10.

An object of my invention is to prepare an aluminum halide-hydrogen halide-hydrocarbon complex which may be employed as an intermediate in the preparation of drying oils, plasticizers and other commercially valuable products. Another object of the invention is to react in admixture aluminum chloride, hydrogen chloride, and a hydrocarbon to form a complex reaction product containing aproximately 5 to 8% aluminum, 25 to 37% chlorine and 55 to 70% carbon and hydrogen. A further object of this invention is to prepare an aluminum chloride-hydrogen chloride-hydrocarbon complex by reacting a non-aromatic hydrocarbon with aluminum chloride and a molar excess of hydrogen chloride (wherein said molar excess is based upon the amount of aluminum chloride utilized in the reaction) to yield said complex, a composition containing an atomic ratio of chlorine to aluminum of approximately 4. Still another object of my invention is to provide an improved process for the preparation of an aluminum halide-hydrogen halide-hydrocarbon complex in which increased amounts thereof are formed which upon subsequent treatment yield greater amounts of valuable hydrocarbon material as compared to the hydrocarbon material separated from an aluminum halide-hydrocarbon complex prepared in the absence of the hydrogen halide reactant or in the presence of lesser amounts of hydrogen halide than herein specified.

Although aluminum halide-hydrocarbon complexes have previously been prepared in the absence or even in the presence of a hydrogen halide, none of the prior products has had the composition of the complex prepared as herein described. The term "complex" is herein used to designate a chemical compound wherein some of the chemical binding forces are believed to be residual valence forces, rather than primary valence forces. In the sense that its components are combined in definite stoichiometric proportions to form stable, recoverable, and reproducible compounds, the "complexes" herein described may be considered to be chemical compounds. It is a feature of my invention that the complex is produced by reacting a hydrocarbon with an aluminum halide in the presence of hydrogen halide under conditions such that said hydrogen halide expressly reacts with said other named reactants. The final product of this invention is further characterized by the fact that it contains hydrogen halide as an integral part of the complex, the hydrogen halide entering into the composition and structure of the final product rather than merely acting as a promotor for the reaction between the aluminum halide and hydrocarbons.

In one of its embodiments, my invention comprises reacting an aluminum halide of a middle halogen (that is, aluminum chloride and aluminum bromide) with a non-aromatic hydrocarbon and a hydrogen halide of a middle halogen and continuing the reaction until at least a molar equivalent of hydrogen halide relative to the amount of aluminum halide utilized has combined with the aluminum halide and hydrocarbon reaction components to form a complex addition product of said hydrocarbon and said halides in which the atomic ratio of chlorine to aluminum therein is approximately 4.

In one of its more specific embodiments the present invention relates to a process for the preparation of a complex addition compound which comprises reacting an olefinic hydrocarbon with aluminum chloride and hydrogen chloride, said hydrogen chloride being contacted with the above named reactants at a superatmospheric pressure.

In a specific embodiment of the present invention an olefinic hydrocarbon polymer is contacted with from about 0.05 to about 0.5 mols of aluminum chloride per mol of olefinic hydrocarbon and with a molar excess of hydrogen chloride based upon the quantity of aluminum chloride introduced into the reaction mixture and said reactants maintained at a superatmospheric pressure to form an addition complex of the named reactants having a composition represented by the formula $AlCl_3 \cdot HCl \cdot C_nH_{2n-m}$, where $n$ is greater than about 10 and generally less than 25 and $m$ varies between about 4 and about 10.

Although the precise mechanism by which the aluminum halide-hydrogen halide-hydrocarbon complexes are formed is not definitely known, I believe that the product is formed by means of a succession of catalyzed reactions involving: (1) the polymerization of olefins; (2) cyclization accompanied by hydrogen transfer or disproportionation of the polymeric olefins with each other and with monomeric olefins so as to produce cyclic poly-olefins and paraffins, the latter forming a relatively saturated hydrocarbon phase or an "upper layer" of reaction products; and (3) coordination of aluminum halide and hydrogen halide with the polyolefins to form the desired complex. This complex is probably that of the material $HAlCl_4$, in which aluminum, which may have a coordination number of six, retains residual valence forces.

A study of the formation and composition of aluminum chloride-hydrocarbon complexes prepared in the presence and in the absence respectively of hydrogen chloride indicates that the mechanism of formation of the complex is somewhat as follows: in the absence of hydrogen chloride, about 2.5 to about 3.5 mols of olefin monomer (when the monomer is a normally liquid olefin such as iso-octene) and about an equal number of mols of aluminum chloride react to form 1 mol of aluminum chloride-hydrocarbon complex addition product. The hydrocarbon portion of said complex, if then separated therefrom, is found to contain approximately 2.5 to 3.5 double bonds per molecule and is found to contain at least 10, and generally an average of about 15 to about 25 carbon atoms per molecule. Moreover, it is noted that each double bond is associated with 1 molecule of aluminum chloride. The hydrogen liberated during the formation of the poly-olefinic bonds is transferred to the upper layer hydrocarbons which undergo polymerization as well as partial hydrogenation.

On the other hand, in the formation of the complex addition product of this invention wherein a hydrogen halide is a reacting component, the latter has been found to be an intrinsic portion of the complex formed in the reaction. About 2.5 to about 3 mols of olefin monomer (again when the monomer is a normally liquid olefin such as iso-octene), 1 mol of aluminum chloride and 1 mol of hydrogen chloride react to form about 1 mol of aluminum chloride-hydrogen chloride-hydrocarbon complex. The hydrocarbon portion thereof, if recovered from the complex, contains approximately 2.5 to 3.5 double bonds per molecule of which approximately 2.5 are associated with each mol of aluminum chloride and of hydrogen chloride. As in the case where the product is formed in the absence of hydrogen chloride, hydrogen liberated during the formation of the new poly-olefinic bonds is transferred to the upper layer hydrocarbons which undergo polymerization as well as partial hydrogenation.

From the above discussion, it may be seen that the average hydrocarbon molecule present in the complex, since it contains 2.5 to 3.5 double bonds per mol, is associated with about 1 to about 1.4 mols of aluminum halide and an equimolar amount of hydrogen halide, so that if the hydrocarbon is $C_pH_{2p-q}$, the complex may be written $(AlX_3)_{1-1.4} \cdot (HF)_{1-1.4} C_nH_{2n-q}$ where $p$ is the number of carbon atoms in the average hydrocarbon molecule (since it is an average, $p$ need not be a whole number) and $q$ is a number which is a measure of the unsaturation of the hydrocarbons. For those hydrocarbon components which are monocyclic, the number of double bonds per mol is $q/2$; some of the higher-boiling components are, however, bicyclic or even more highly condensed, so that the number of double bonds per average mol is $$\frac{q-2}{2}$$

or more generally $$\frac{q-2r}{2}$$

where $r+1$ is the total number of non-aromatic rings per average molecule. Since some of the highest-boiling fractions of the hydrocarbon component may have aromatic components (although the hydrocarbons as a whole are quite low in aromatics) $q$ in the above formula is even somewhat larger than the number of rings and of double bonds would indicate, and it has been found convenient to express the general empirical formula of the complex as $$AlX_3 \cdot HX \cdot C_nH_{2n-m}$$

where $n$ is a number greater than 10 and $m$ varies between about 4 and about 10.

Compounds or complexes of this type which I have prepared from aluminum chloride and hydrogen chloride contain approximately 5 to 8 weight per cent aluminum, 25 to 37 per cent chlorine (with the chlorine to aluminum atomic ratio about 4) and 55 to 70 per cent carbon and hydrogen, with a hydrogen to carbon atomic ratio of about 1.7. The corresponding material prepared from aluminum bromide and hydrogen bromide contains about 3 to 4.5 weight per cent aluminum, about 50 to 70 weight per cent bromine, and about 25 to 47 weight per cent hydrocarbons. It should be noted that the chlorine in the complex of my invention is not organically bound by primary valence forces, as evidenced by the fact that it may be separated substantially completely from the sludge hydrocarbons by aqueous hydrolysis at room temperature.

The hydrocarbons formed either in the presence of or in the absence of hydrogen halide appear to be substantially the same. The complexes from which they are derived, however, differ considerably in composition in that those formed in the absence of hydrogen halide have 1 atom of aluminum halide associated with each double bond (or in other words, about 2.5 mols of aluminum halide per molecule of aluminum halide-hydrocarbon complex) while those formed in the presence of hydrogen halide have one aluminum halide and one hydrogen halide (possibly as $HAlX_4$) associated with about 2.5 double bonds of the polyolefinic hydrocarbon. A further distinction in the two reactions lies in the fact that the complex prepared in the presence of the molar excess of hydrogen halide is done so in about one-third to about one-fifth the time required for the preparation of those complexes prepared in the absence of hydrogen halide.

The complexes of my invention are preferably prepared from olefinic hydrocarbons containing at least three carbon atoms per molecule, such as polymer olefins, cracked gases (represented for example by butylene, amylene, etc.), olefinic gasolines obtained, for example, by petroleum cracking operations and other substantially aromatic-free stocks. Similar results may be obtained by using paraffinic hydrocarbons containing at least 4 carbon atoms per molecule, particularly when said paraffins are of highly branched chain structure, although in the latter case the reaction period may be longer and the reaction temperature higher than when utilizing olefinic hydrocarbons. Under the conditions of reaction specified herein, the paraffinic hydrocarbons are presumably cracked to olefinic fragments which then form the complexes of this invention by hydrogen transfer and the other mechanisms believed to be involved in the formation of the complex, as described above.

Although my invention is directed primarily toward the use of chlorides, other halides such as aluminum bromide and hydrogen bromide may be employed with substantially equal effectiveness. Aluminum fluoride, however, is not to be considered as equivalent to the bromides and chlorides in effectiveness. It is also within the scope and contemplation of the present invention to utilize an alkyl halide and a corresponding halide of aluminum as charging stock in the present process, said alkyl halide reacting in similar fashion to the combination of hydrocarbon and hydrogen halide heretofore mentioned. Thus, an alkyl chloride or an alkyl bromide may be substituted with substantially equivalent effectiveness for an olefin and a hydrogen halide containing a corresponding number of carbon atoms and type of halogen respectively.

The formation of the present complexes is effected at relatively low temperatures, up to about 200° C. The reaction attains useful velocities at temperatures as low as from about 0° to about 25° C., depending upon the reactivity of the reactants, and it is generally preferred to effect the reaction at temperatures considerably below 200° C., and generally below about 100° C. Superatmospheric pressures are not necessarily essential to the present process, although the addition of hydrogen halide to the complex is facilitated at pressures above atmospheric. In some cases, a superatmospheric pressure is desirable to maintain the hydrocarbon reactant in substantially liquid phase.

A typical operation for the preparation of the complexes of my invention may be described as follows: Powdered aluminum chloride is introduced into a reactor equipped with a stirring mechanism. The hydrocarbon charge is added, stirring is begun, and the hydrogen chloride introduced. In order to control the temperature more effectively and prevent the initial high temperature obtained by contacting all of the hydrocarbon with all of the aluminum chloride at once, it may be more desirable to add the powdered aluminum chloride slowly to the stirred hydrocarbon charge. As the initial reaction is usually highly exothermic, extraneous cooling is initially applied, but as the reaction progresses, cooling becomes unnecessary and the reaction mixture is gradually heated. The hydrogen chloride is continuously introduced below the surface of the reaction mixture and means are provided for collecting any evolved, unabsorbed hydrogen chloride. The hydrogen chloride may be recycled or fresh hydrogen chloride added until at least a molar excess of said hydrogen chloride, based upon the aluminum chloride introduced into the reaction mixture is combined with the reactants to form the present complex. When conversion is complete, usually after a reaction period of from 10 minutes to two hours or more, the reaction mixture is directed to a settling zone wherein the upper layer comprising substantially saturated hydrocarbons formed by polymerization and partial hydrogenation during the reaction is withdrawn and the lower layer which comprises the complex of my invention is removed. The upper layer saturated hydrocarbons constitute a valuable by-product of this process, and the low-boiling fractions thereof are useful as a high octane motor fuel component.

In an alternative method of preparation, the reactants are introduced into a closed vessel and agitated by vigorous stirring in the presence of the hydrogen halide, preferably at a superatmospheric pressure. According to a further modification of the process, continuous operation may be accomplished, for example, by continuously admixing the aluminum halide and hydrocarbon reactant in a mixer in which the above reactants are vigorously agitated, at a low temperature, until the hydrocarbon stream has dissolved the desired quantity of aluminum halide and thereafter allowing the solution to contact a current of hydrogen halide flowing countercurrent to the aluminum halide-hydrocarbon solution through an elongated reaction vessel the temperature being so controlled as to cause the major portion of the reaction to take place in the presence of the hydrogen halide. In the continuous process desirable contact of the aluminum halide-hydrocarbon solution and hydrogen halide may be enhanced by allowing the hydrocarbon-aluminum halide solution to flow over a suitable contact material such as quartz chips, and glass, etc., while contacting an ascending stream of hydrogen halide maintained at a superatmospheric pressure.

The hydrocarbon material from the lower layer may be recovered by subjecting the complex to hydrolysis and removing by decantation the hydrocarbons freed thereby. If water is slowly added to the complex to effect hydrolysis, during the initial stages, considerable quantities of anhydrous gaseous hydrogen halide are evolved. This may be recovered for re-use in the manufacture of the complex. The recovered hydrocarbon material has drying oil properties and may be used as a substitute for, or in combination with, natural or synthetic drying oils. By virtue of the highly unsaturated character of the hydrocarbon material recovered, and particularly because of its conjugated unsaturation, the hydrocarbons may be further reacted in a number of ways to form valuable materials useful as plasticizers, resinous products, etc.

Infra-red and ultra-violet absorption measurements as well as other analytical data determined on the unsaturated hydrocarbon material separated from the complex product of this invention have shown that the polymeric polyenes contained in the hydrocarbon fraction are of cyclic structure but are substantially non-aromatic (except for the highest-boiling fractions) and have isolated unsaturation in addition to conjugated unsaturation. Representative hydrocarbon fractions recovered from aluminum halide-hydrogen halide-hydrocarbon complexes which I have analyzed usually have a wide boiling range of from about 150° to over 450° C., density of from about 0.83 to about 0.93, index of refraction of from about 1.47 to about 1.53 (usually 1.48 to 1.50) specific dispersion values of from about 125 to about 160 (but usually between 135 and 145), bromine numbers above about 140 (although they vary with the average molecular weight), maleic anhydride values of from about 40 to about 80 (usually in the range of about 45 to about 75), acid number below about 3, average number of olefinic double bonds per molecule varying between about 2.5 and about 3.5, of which from about 40 to about 70% or higher are conjugated, and average molecular weights of from about 200 to about 400, although the usual average is in the neighborhood of 300. Unsaturated hydrocarbon fractions derived from the present complexes have also been prepared in which some of the hydrocarbons have molecular weights of as low as about 150 to as high as about 1000.

The following examples are introduced for the purpose of illustrating typical methods of operating the present process, although the process variables stated therein are not to be construed as limiting the scope of the invention in any of its generally broad aspects.

EXAMPLE I 852 g. of stabilized nonselective polymer gasoline (7.8 mols based upon the average molecular weight of the hydrocarbons contained in the fraction), prepared by the polymerization of a propylene-butylene gas mixture and boiling from about 52° to about 210° C. was charged into a stirred autoclave followed by the addition thereto of 103.8 g. (0.782 mol) of finely powdered anhydrous aluminum chloride. The temperature of the mixture was increased to 90° C. and anhydrous hydrogen chloride at superatmospheric pressure of about 2 inches of mercury was bubbled into the mixture until 49.3 g. of hydrogen chloride had been absorbed by the mixture of the aforementioned reactants. The resultant mixture was stirred for an additional 10 hours, and allowed to cool and stratify into an upper hydrocarbon layer and a lower layer containing the desired aluminum chloride-hydrogen chloride-hydrocarbon complex addition product. The upper layer, amounting to 637.3 g. and comprising essentially saturated hydrocarbons was decanted from the lower layer, washed with water and distilled. The CFR octane number of its 400° F. E. P. fraction was 82.6 clear, and 93.3 with 2 cc. of tetraethyl lead fluid per gallon. The lower layer separated from the reaction mixture weighed 350.0 g., representing a yield, based upon the total quantity of reactants, of 35% or a conversion of 25.2% of the hydrocarbon charge to polyunsaturates present in the lower layer. When analyzed, the lower layer was found to contain 6.1% aluminum, 31.5 chlorine and 62.4 hydrocarbons, the complex containing an atomic ratio of chlorine to aluminum of 3.93. The yield of lower-layer hydrocarbons was 2.1 lbs. per pound of aluminum chloride charged.

To the above 350 g. of complex addition was slowly added 705 g. of water at such a rate as to maintain a temperature of not over 60° C. The resultant hydrolysis liberated 216.0 g. of hydrocarbons from the complex which separated from the aqueous phase as an insoluble upper layer. The hydrocarbons were removed from the aqueous phase and their properties determined. The data in the following Table I indicates the physical properties determined on the hydrocarbons obtained by the hydrolysis of the aluminum chloride-hydrogen chloride-hydrocarbon complex as prepared above.

Table I

| | |
|---|---|
| Boiling range, °C | 160 to >400 |
| Density, $d_4^{20}$ | 0.862 |
| Refractive index, $n_D^{20}$ | 1.4859 |
| Specific dispersion | 141 |
| Molecular weight | 298 |
| Diene number | 46.2 |
| Bromine number | 144 |
| Specific refraction | 0.333 |

EXAMPLE II

In the following example a similar charge of reactants was employed, but the mol ratio of hydrocarbon to aluminum chloride was decreased from approximately 10 to 1 to approximately 5 to 1. 444.0 g. of stabilized nonselective polymer gasoline (4.07 mols) was charged into a stirred autoclave followed by addition thereto of 108.4 g. (0.815 mol) of finely powdered anhydrous aluminum chloride. The temperature of the mixture was increased to 60° C. and anhydrous hydrogen chloride at a pressure of about two inches of mercury was bubbled into the mixture until 32.3 g. of hydrogen chloride was absorbed. A procedure similar to that employed in Example I was utilized for the separation of the aluminum chloride-hydrogen chloride-hydrocarbon complex contained in the lower layer of the products from the upper layer saturated hydrocarbons. 261.6 g. of hydrocarbon upper layer, representing 56.1% of the initial hydrocarbon charge was removed from the reactor and 306.2 g. of lower layer, containing 38.5% by weight of the initial hydrocarbon charge in the form of a complex, was recovered. The yield of lower layer hydrocarbons was 1.6 lbs. per pound of aluminum chloride charged. An analysis of the complex addition product indicated that it contained 7.25% aluminum, 36.2% chlorine and 55.9% hydrocarbons, the atomic ratio of chlorine to aluminum being 3.80 on the basis of the analysis.

Hydrolysis of the complex addition product according to a procedure similar to that employed in Example I caused the separation of a highly unsaturated polyolefinic, polycyclic, hydrocarbon fraction from the complex having the physical properties indicated in the following Table II.

Table II

| | |
|---|---|
| Boiling range, °C | 165 to >400 |
| Density, $d_4^{20}$ | 0.870 |
| Refractive index, $n_D^{20}$ | 1.4859 |
| Specific dispersion | 136 |
| Molecular weight | 288 |
| Diene number | 57.7 |
| Bromine number | 195 |
| Specific refraction | 0.330 |

EXAMPLE III

The following experiment was run to determine the effect of the absence of hydrogen chloride from the reaction mixture on the composition of the resultant complex, particularly, on the chlorine to aluminum atomic ratio contained in the complex product. 2220 g. of stabilized nonselective polymer gasoline (22.5 mols) was charged into a stirred autoclave and 300 g. (2.25 mols) of finely powdered aluminum chloride was slowly added. As the gasoline was stirred the temperature of the mixture was increased to 70° C. and the mixture was stirred for 10 hours. Following the above reaction period, the mixture was allowed to cool and stratify into an upper hydrocarbon layer containing essentially saturated hydrocarbons and a lower insoluble layer comprising a complex of aluminum chloride and hydrocarbons. The upper layer, 1816 g., representing 81.8% of the hydrocarbons charged to the reaction mixture was decanted from the reaction mixture leaving 595.2 g. of lower layer complex addition products, the lower layer hydrocarbons representing 12.7% of the initial hydrocarbon charge—a yield of only 0.94 lb. per pound of aluminum chloride utilized. Analysis of the lower layer indicated that it contained 10.1% aluminum, 39.1% chlorine and 47.3% hydrocarbon, the chlorine to aluminum atomic ratio of the complex being 2.94. The properties of the polycyclic, polyolefinic hydrocarbons recovered from the complex by hydrolysis thereof showed that it was somewhat less slightly unsaturated (bromine number 136) and had a lower diene number (40.3) than the hydrocarbons prepared by the hydrolysis of a complex in which hydrogen chloride is utilized.

I claim as my invention:

1. A process for the production of a hydrocarbon material having drying oil properties which comprises contacting at a reaction temperature below 200° C., an olefinic hydrocarbon polymer with from about 0.05 to about 0.5 mol of aluminum chloride per mol of polymer and with a molar excess of hydrogen chloride based upon the quantity of the aluminum chloride, continuing the reaction until a molar equivalent of hydrogen chloride relative to the amount of aluminum chloride has combined with the latter and with said polymer, thereby forming an aluminum chloride-hydrogen chloride-hydrocarbon complex addition product, separating said addition product and subjecting the same to hydrolysis to liberate the hydrocarbons therefrom, and recovering the thus liberated hydrocarbons.

2. A process for the production of a hydrocarbon material having drying properties which comprises contacting at a temperature below about 200° C. an aluminum halide of a middle halogen with an olefinic hydrocarbon and a molar excess of a hydrogen halide of a middle halogen, said molar excess being based upon the quantity of aluminum halide utilized, continuing the reaction until a molar equivalent of the hydrogen halide relative to the amount of aluminum halide has combined with the latter and with said hydrocarbon, separating from an upper, substantially saturated, hydrocarbon layer a lower layer comprising an aluminum halide-hydrogen halide-hydrocarbon complex addition product, subjecting said lower layer to hydrolysis to liberate the hydrocarbons from the complex addition product, and recovering the thus liberated hydrocarbons.

3. A process for the production of a hydrocarbon material having drying properties which comprises contacting aluminum chloride at a temperature below about 200° C. with an olefinic hydrocarbon and a molar excess of hydrogen chloride at a superatmospheric pressure, said molar excess being based upon the quantity of aluminum chloride utilized, continuing the reaction until a molar equivalent of the hydrogen chloride relative to the amount of aluminum chloride has combined with the latter and with said hydrocarbon, separating a lower layer comprising an aluminum chloride-hydrogen chloride-hydrocarbon complex addition product from an upper, substantially saturated hydrocarbon layer, subjecting said lower layer to hydrolysis to liberate the hydrocarbons from the complex addition product, and recovering the thus liberated hydrocarbons.

4. A process for the production of a hydrocarbon material having drying properties which comprises contacting at a temperature below about 200° C. an aluminum halide of a middle halogen with a non-aromatic hydrocarbon and a molar excess of a hydrogen halide of a middle halogen, said molar excess being based upon the quantity of aluminum halide utilized, continuing the reaction until a molar equivalent of the hydrogen halide relative to the amount of aluminum halide has combined with the latter and with said hydrocarbon, separating from an upper, substantially saturated, hydrocarbon layer a lower layer comprising an aluminum halide-hydrogen halide-hydrocarbon complex addition product, subjecting said lower layer to hydrolysis to liberate the hydrocarbons from the complex addition product, and recovering the thus liberated hydrocarbons.

5. A process for the production of a hydrocarbon material having drying properties which comprises contacting aluminum chloride at a temperature below about 200° C. with a non-aromatic hydrocarbon and a molar excess of hydrogen chloride at a superatmospheric pressure, said molar excess being based upon the quantity of aluminum chloride utilized, continuing the reaction until a molar equivalent of the hydrogen chloride relative to the amount of aluminum chloride has combined with the latter and with said hydrocarbon, separating a lower layer comprising an aluminum chloride-hydrogen chloride-hydrocarbon complex addition product from an upper, substantially saturated hydrocarbon layer, subjecting said lower layer to hydrolysis to liberate the hydrocarbons from the complex addition product, and recovering the thus liberated hydrocarbons.

HERMAN S. BLOCH.

REFERENCES CITED

The following references are of record in the file of this patent:

UNITED STATES PATENTS

| Number | Name | Date |
| --- | --- | --- |
| 1,825,270 | Jenkins et al. | Sept. 29, 1931 |
| 1,825,294 | Wolcott | Sept. 29, 1931 |
| 2,180,220 | Boyd | Nov. 14, 1939 |
| 2,220,090 | Evering et al. | Nov. 5, 1940 |
| 2,320,256 | Bailey et al. | May 25, 1943 |
| 2,329,397 | d'Ouville et al. | Sept. 14, 1943 |
| 2,381,987 | Shoemaker et al. | Aug. 14, 1945 |

OTHER REFERENCES

Ipatieff et al., Ind. Eng. Chem., vol. 28, 461–464 (1936).